US012571652B2

(12) United States Patent (10) Patent No.: US 12,571,652 B2

Honma (45) Date of Patent: Mar. 10, 2026

(54) DISPLAY CONTROL DEVICE, HEAD-UP DISPLAY DEVICE, AND DISPLAY CONTROL METHOD

(71) Applicant: Nippon Seiki Co., Ltd., Niigata (JP)

(72) Inventor: Hanako Honma, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 60 days.

(21) Appl. No.: 18/703,259

(22) PCT Filed: Oct. 25, 2022

(86) PCT No.: PCT/JP2022/039645

§ 371 (c)(1),
(2) Date: Apr. 19, 2024

(87) PCT Pub. No.: WO2023/074662

PCT Pub. Date: May 4, 2023

(65) Prior Publication Data

US 2025/0231047 A1 Jul. 17, 2025

(30) Foreign Application Priority Data

Oct. 28, 2021 (JP) .................................. 2021-176752

(51) Int. Cl.
B60K 35/81 (2024.01)
B60K 35/23 (2024.01)
(Continued)

(52) U.S. Cl.
CPC .......... G01C 21/3867 (2020.08); B60K 35/23 (2024.01); B60K 35/81 (2024.01);
(Continued)

(58) Field of Classification Search
CPC .............. G01C 21/3867; G01C 21/365; G01C 21/367; G01C 21/26; B60K 35/23;
(Continued)

(56) References Cited

U.S. PATENT DOCUMENTS

| | | | | |
|---|---|---|---|---|
| 5,941,932 A | * | 8/1999 | Aikawa | ................... G06T 15/20 |
| | | | | 340/995.14 |
| 6,710,774 B1 | | 3/2004 | Kawasaki et al. | |
| 2013/0054137 A1 | | 2/2013 | Arai | |

FOREIGN PATENT DOCUMENTS

| | | | | |
|---|---|---|---|---|
| JP | H09325692 A | * | 12/1997 | |
| JP | 2001-27533 A | | 1/2001 | |

(Continued)

OTHER PUBLICATIONS

International Search Report received in PCT Application No. PCT/JP2022/039645, dated Jan. 10, 2023.

*Primary Examiner* — Rodney A Butler

(74) *Attorney, Agent, or Firm* — Rimon P.C.

(57) ABSTRACT

The present invention presents highly useful information while emphasizing the sense of perspective of a route guidance image. According to the present invention, a processor displays a route guidance image 200 on a head-up display device 20 such that the width Wn of a nearby region of the route guidance image 200 in the left-right direction is longer than the width Wf of a faraway region in the left-right direction. When increasing the scale of the route guidance image 200, the processor increases the ratio (Wf/Wn) of the faraway width Wf to the nearby width Wn.

9 Claims, 5 Drawing Sheets

(51) Int. Cl.

| | | |
|---|---|---|
| *G01C 21/00* | (2006.01) | |
| *G01C 21/36* | (2006.01) | |
| *B60K 35/22* | (2024.01) | |

(52) U.S. Cl.
CPC ......... *G01C 21/365* (2013.01); *G01C 21/367* (2013.01); *B60K 35/22* (2024.01)

(58) Field of Classification Search
CPC .. B60K 35/81; B60K 35/22; B60K 2360/166; B60K 2360/177; B60K 35/233; G09B 29/106; G02B 27/01
See application file for complete search history.

(56) References Cited

FOREIGN PATENT DOCUMENTS

| JP | 2013-48361 A | 3/2013 |
|---|---|---|
| WO | 2020/040276 A1 | 2/2020 |
| WO | 2021/166878 A1 | 8/2021 |

* cited by examiner

[FIG.1]
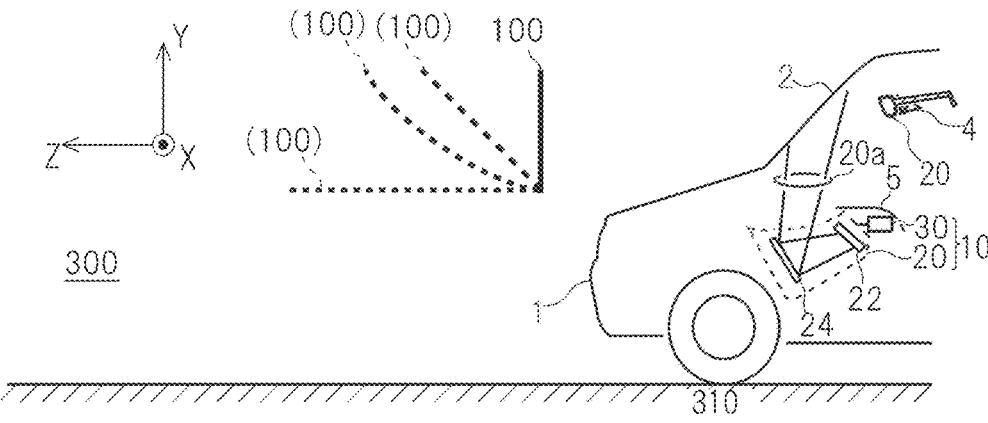
[FIG.2]
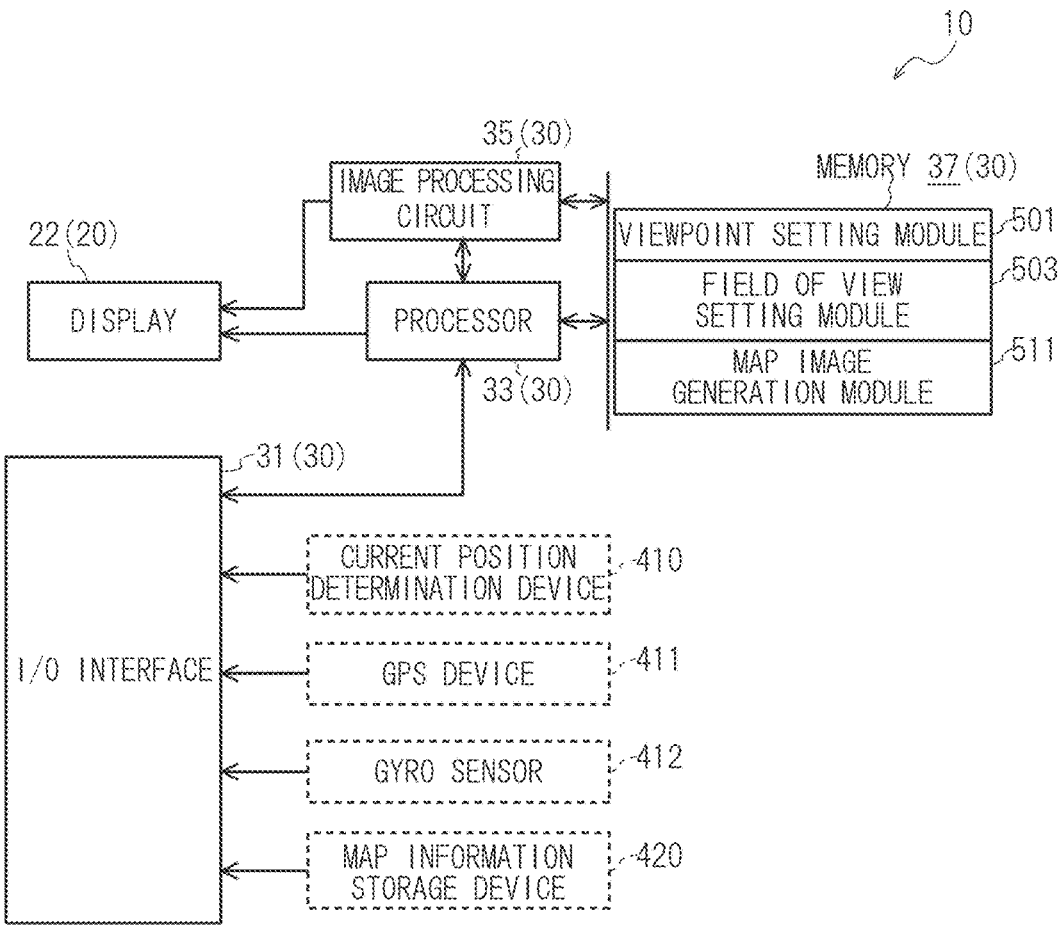

[FIG.3]
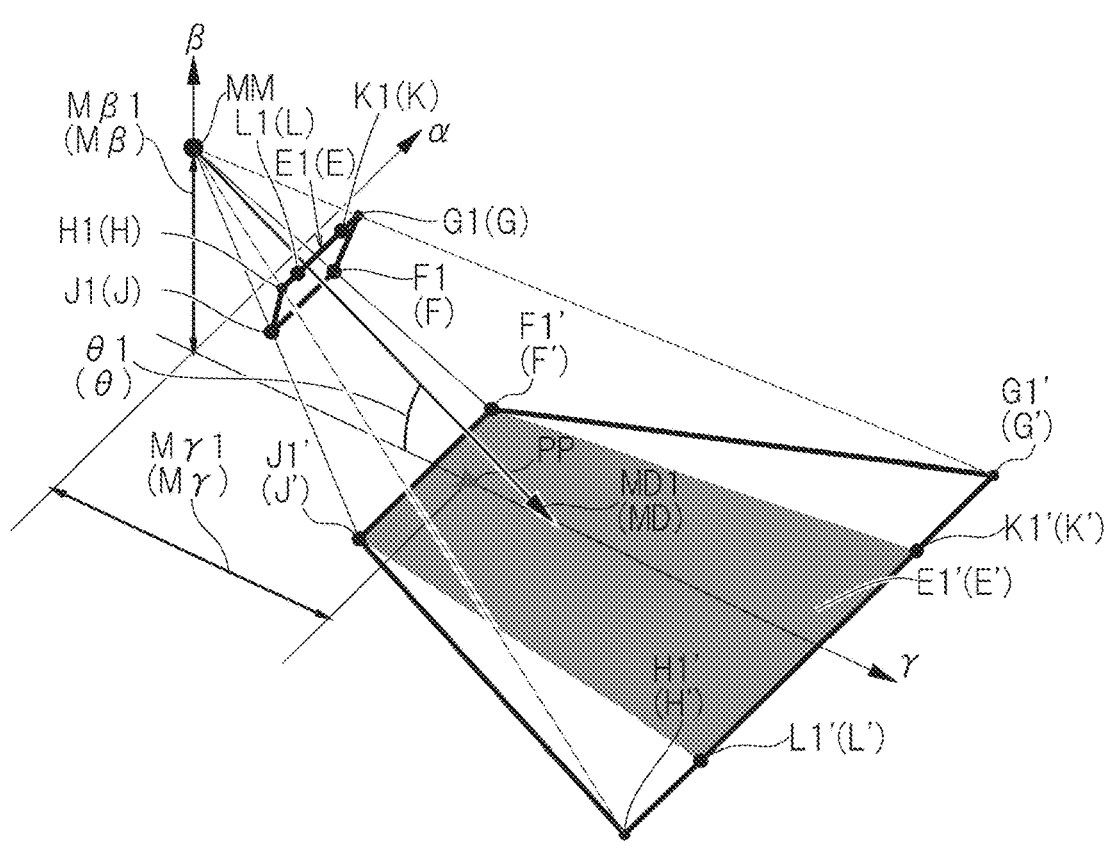
[FIG.4]
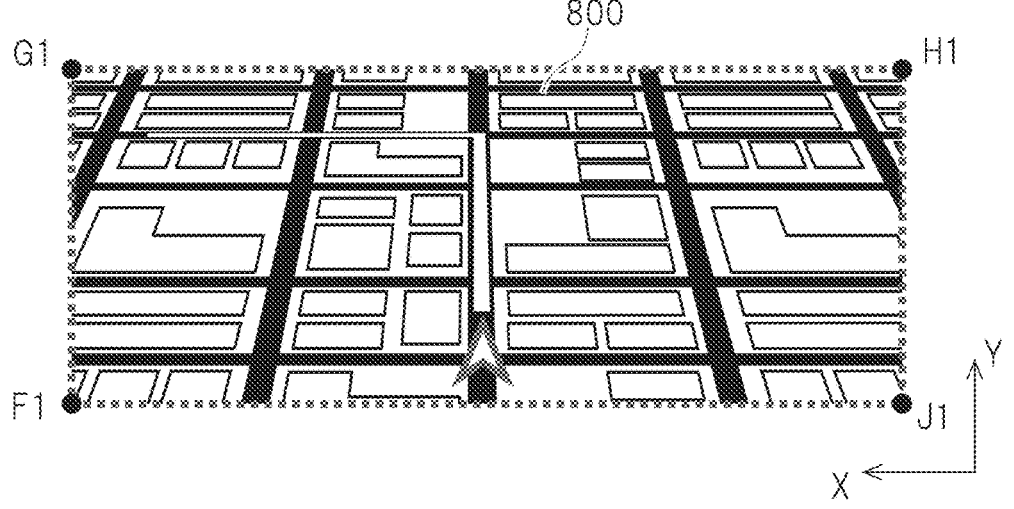

[FIG.5]
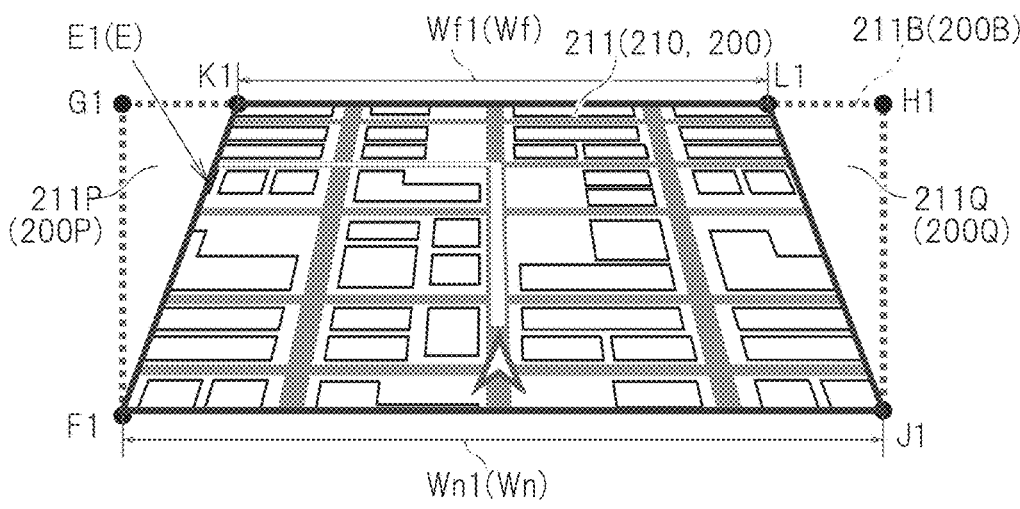
[FIG.6]
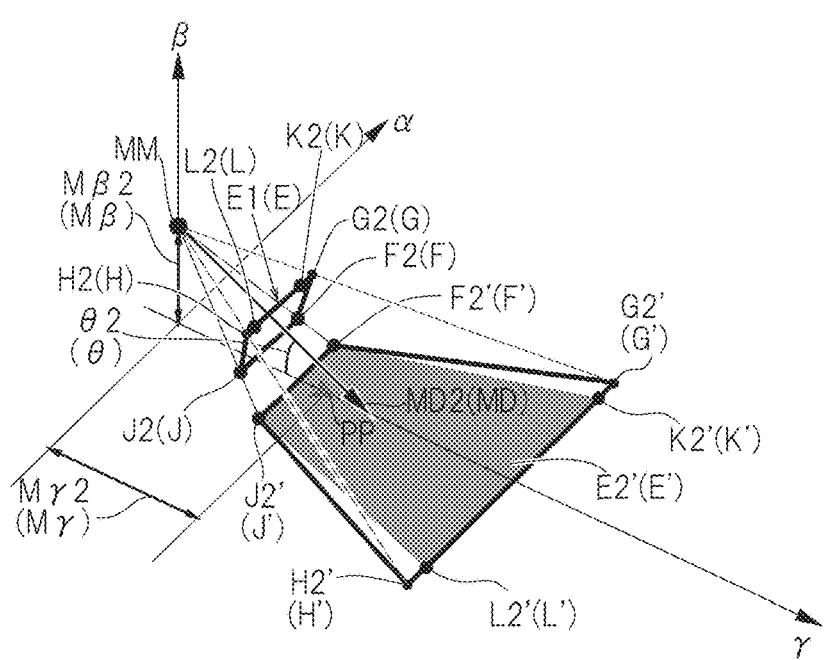

[FIG.7]
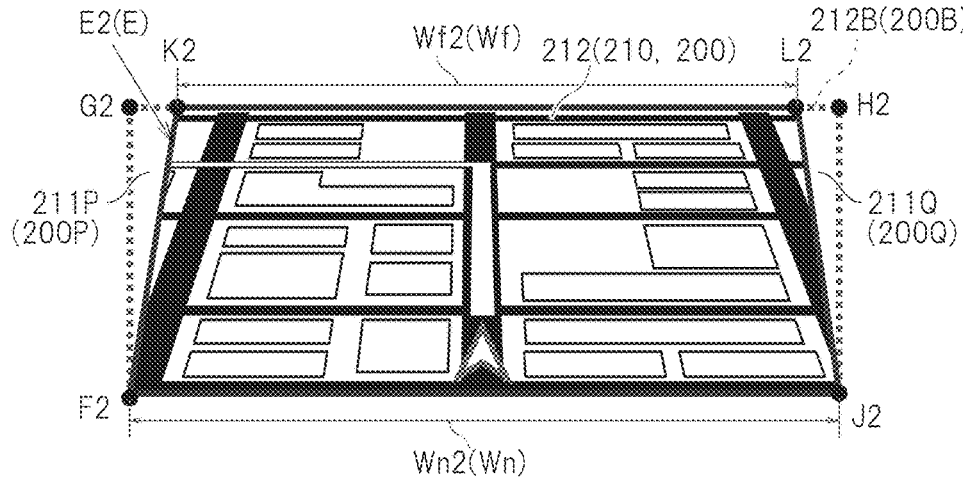
[FIG.8]
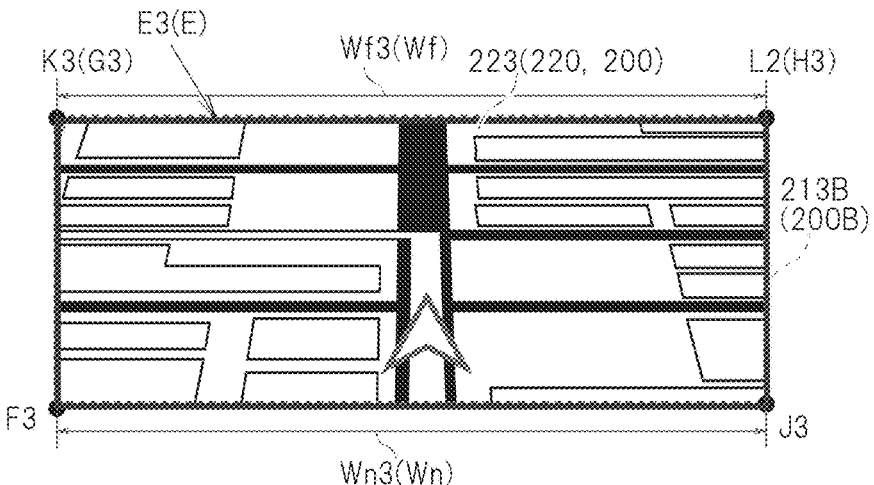
[FIG.9]
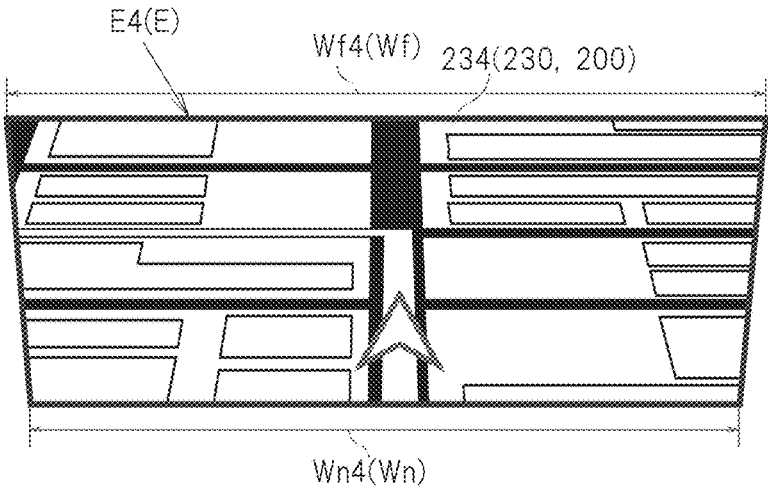

[FIG.10]
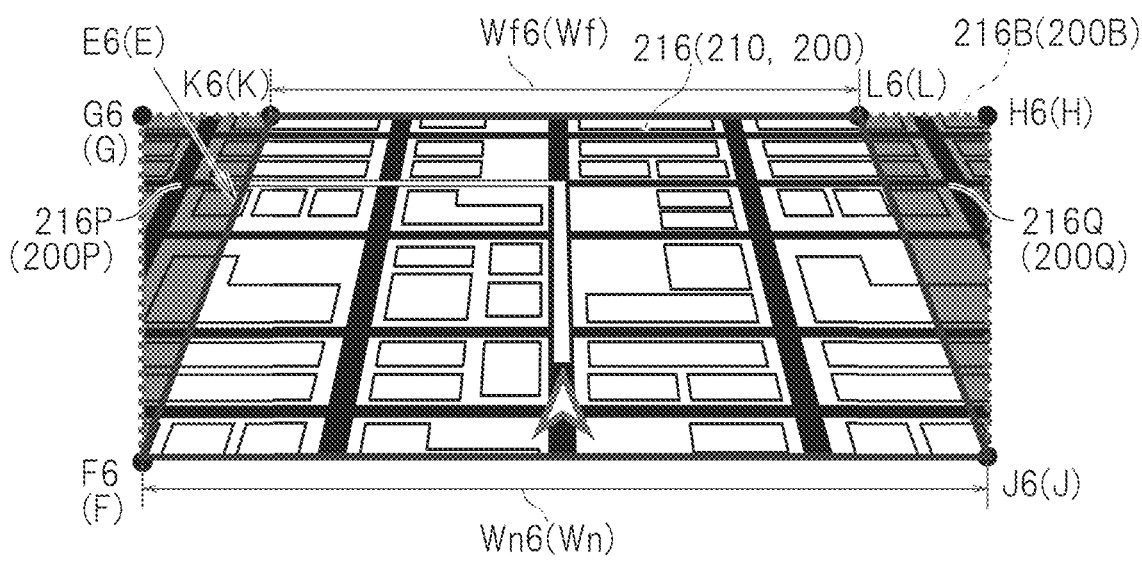
[FIG.11]
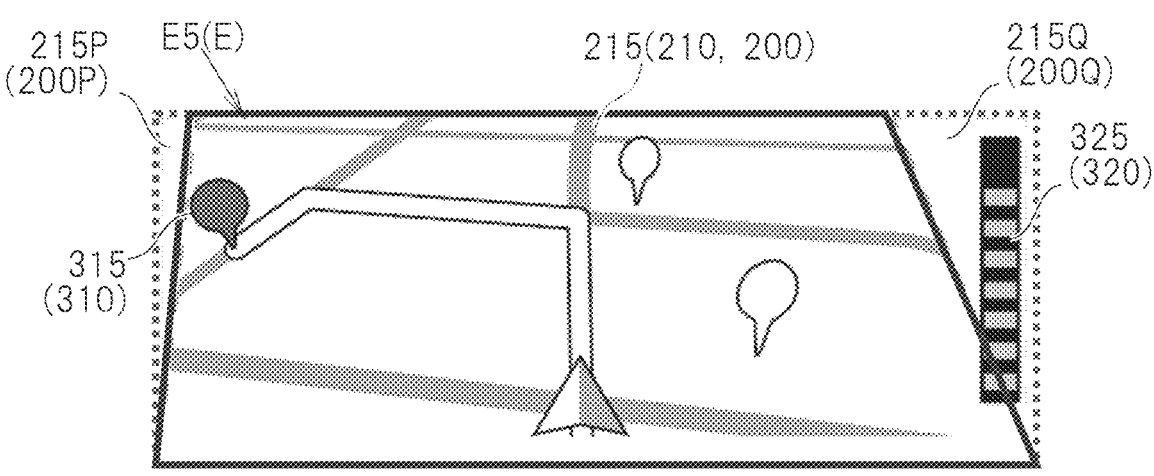

DISPLAY CONTROL DEVICE, HEAD-UP DISPLAY DEVICE, AND DISPLAY CONTROL METHOD

CROSS-REFERENCE TO RELATED APPLICATIONS

This application is the U.S. National Phase under 35 U.S.C. § 371 of International Application No. PCT/JP2022/039645, filed on Oct. 25, 2022, which claims the benefit of foreign priority to Japanese Patent Application No. 2021-176752 filed on Oct. 28, 2021, the entire contents of each of which are hereby incorporated by reference.

TECHNICAL FIELD

The present disclosure relates to a display control device, a head-up display device, and a display control method which are used in a vehicle to superimpose an image on the foreground of the vehicle and make it visible.

BACKGROUND ART

A known head-up display device displays a route guidance image (also called a map image) illustrating a guide route which is drawn using the one-point perspective (perspective) method. In particular, the head-up display device disclosed in Patent Document 1 displays a pair of two linear images at the boundary between left and right of the route guidance image, and emphasizes the sense of perspective of the route guidance image by narrowing the interval in the left-right direction between the two linear images (in other words, the width in the left-right direction of the route guidance image sandwiched between the two linear images) for the faraway display area and widening the interval for the nearby display area.

PRIOR ART DOCUMENT

Patent Document

Patent Document 1: WO 2020/040276

SUMMARY OF THE INVENTION

Problems to be Solved by the Invention

In the related art, the sense of perspective of the route guidance image can be emphasized, but since the width of the faraway expression area in the left-right direction is continuously narrowed (the display area is limited), there is room for improvement in terms of convenience as the route guidance image.

Solution to Problem

A summary of specific embodiments disclosed herein is provided below. It should be understood that these modes are presented merely to provide readers with the summary of the specific embodiments and are not intended to limit the scope of the present disclosure. In practice, the present disclosure may include various modes not set forth below.

The summary of the present disclosure relates to improving convenience as the route guidance image. More specifically, the present disclosure also relates to presenting highly convenient information while emphasizing the sense of perspective of the route guidance image.

Accordingly, to solve the above-described problem, the display control device, the head-up display device, and the display control method described herein have adopted the following measures. Summarized, the present embodiment displays the route guidance image on the head-up display device, in which a width of a nearby region in the left-right direction (hereinafter referred to as a nearby width) of the route guidance image is longer than a width of a faraway region in the left-right direction (hereinafter referred to as a faraway width) of the route guidance image, and a ratio of the faraway width to the nearby width is increased when the scale of the route guidance image is increased.

Therefore, a display control device according to a first embodiment of the present invention is a display control device that displays a video in front of a front windshield of a vehicle as a virtual image, including at least one processor configured to display a route guidance image on a head-up display device, in which a width of a nearby region of the route guidance image in the left-right direction (herein after referred to as a nearby width) is longer than a width of a faraway region in the left-right direction (hereinafter referred to as a faraway width), and a ratio of the faraway width to the nearby width is increased when the scale of the route guidance image is increased. The first embodiment of the present invention emphasizes a sense of perspective of the route guidance image by decreasing the faraway width and increasing the nearby width before enlarging the route guidance image, while also assuming an advantage of relatively widening the faraway display area which gradually becomes more useful in a situation of enlarging the route guidance image. In other words, highly useful information for users can be presented.

According to a particularly preferred second embodiment, the processor is configured to generate the route guidance image in a manner to have a virtual depression angle from a virtual viewpoint and, when increasing the scale of the route guidance image, decrease the depression angle. By decreasing the depression angle of the route guidance image, which is an overhead view display, the depression angle of the virtual viewpoint overlooking the map image in the displayed route guidance image approaches the depression angle of the viewpoint of the user who is boarding the own vehicle and overlooking the foreground view of the own vehicle. In other words, a gap between the route guidance image and the foreground visually recognized by the user decreases, making it easier to connect the position information indicated by the route guidance image and the foreground. The second embodiment of the present invention facilitates the connection of the position information indicated by the route guidance image and the foreground, while also assuming an advantage of relatively widening the faraway display area which gradually becomes more useful.

According to a third embodiment, the processor is configured to display a first route guidance image having a first ratio. When increasing the ratio of the first route guidance image, the processor displays a second route guidance image having a second ratio larger than the first ratio. When increasing the ratio of the second route guidance image, the processor displays a third route guidance image having a third ratio larger than the second ratio, making a third nearby width of the third route guidance image approximately equal to a third faraway width. The faraway width of the route guidance image which becomes more useful along with the enlargement of the route guidance image can be relatively increased.

According to a fourth embodiment, the processor is configured to display the first route guidance image having the first ratio. When increasing the ratio of the first route guidance image, the processor displays the second route guidance image having the second ratio larger than the first ratio. When increasing the ratio of the second route guidance image, the processor displays the third route guidance image having the third ratio larger than the second ratio, making the third nearby width of the third route guidance image shorter than the third faraway width. The faraway width of the route guidance image which becomes more useful along with the enlargement of the route guidance image can be relatively increased.

According to fifth to seventh embodiments, the route guidance image is configured to include at least one of a left region between a bounding box surrounding the route guidance image and the left side of the route guidance image and a right region between the bounding box and the right side of the route guidance image. In the left region and the right region, the route guidance image is not displayed. This allows the user to visually recognize the nearby width of the route guidance image as longer and the faraway width as shorter, emphasizing the sense of perspective. However, this is not limiting and, in a broad sense, the left region and the right region may display an image continuing from the route guidance image.

According to a particularly preferred fifth embodiment, the processor is configured to display, in at least one of the left region and the right region, a blurred and/or darkened route guidance peripheral image continuing from the route guidance image. According to the fifth embodiment, the visibility decreases in the image displayed in the left region or the right region continuing from the route guidance image by blurring and/or darkening. For this reason, the route guidance image has higher visibility than the image displayed in the left region or the right region, and lacks the left region and the right region of the rectangular bounding box, giving the sense of perspective as an image having a short faraway width and a long nearby width. Furthermore, blurring and/or darkening the left region (right region) can further emphasize the sense of perspective of the route guidance image.

According to a particularly preferred sixth embodiment, the processor is configured to expand the display area of the route guidance image so that the left region becomes smaller when a map object on the route guidance image is present around the left region, and expand the display area of the route guidance image so that the right region becomes smaller when a map object is present around the right region. Accordingly, the display area of the route guidance image is expanded when the specific map object on the route guidance image is present in the left region (right region) in which no route guidance image is displayed, a blurred image continuing from the route guidance image is displayed, or a darkened image continuing from the route guidance image is displayed. This suppresses cutting off the specific map object from the route guidance image or displaying the specific map object on the boundary of the route guidance image.

According to a particularly preferred seventh embodiment, the processor is configured to reduce the display area of the route guidance image so that the left region becomes larger when a non-map object different from the map object on the route guidance image is present around the left region, and reduce the display area of the route guidance image so that the right region becomes larger when a non-map object is present around the right region. In the above embodiment, when increasing the scale of the route guidance image, the left region (right region) is relatively reduced and the faraway region of the route guidance image is relatively enlarged. However, when a non-map object is displayed in the narrowed left region and/or right region (the faraway region of the expanded route guidance image), the faraway region of the expanded route guidance image is difficult to recognize visually and is not effectively used. In the present embodiment, when visually recognizing such an enlarged faraway region of the route guidance image is difficult, the route guidance image can be reduced so as to increase the left region (right region), thus emphasizing the sense of depth.

BRIEF DESCRIPTION OF THE DRAWINGS

FIG. 1 illustrates an application example of a vehicle display system to a vehicle according to some embodiments.

FIG. 2 is a block diagram of a vehicle display system according to some embodiments.

FIG. 3 illustrates a region of a map image around the own vehicle displayed as a route guidance image.

FIG. 4 illustrates a route guidance image of a comparative example.

FIG. 5 illustrates a route guidance image in some embodiments.

FIG. 6 illustrates an example of an area of a map image around the own vehicle displayed as the route guidance image, in which a virtual viewpoint is closer to the own vehicle than in FIG. 3.

FIG. 7 illustrates a route guidance image observed from the virtual viewpoint illustrated in FIG. 6.

FIG. 8 illustrates a route guidance image in some embodiments.

FIG. 9 illustrates a route guidance image in some embodiments.

FIG. 10 illustrates a route guidance image in some embodiments.

FIG. 11 illustrates a route guidance image in some embodiments.

MODE FOR CARRYING OUT THE INVENTION

In the following, a structure of an exemplary vehicle display system is described with reference to FIGS. 1 to 3 and FIGS. 5 to 11. FIG. 4 provides a display example of the image according to a comparative example. It should be noted that the present invention is not limited by the following embodiments (including the contents of the drawings). It is matter of course that changes can be added to the following embodiments (including deletion of constituent components). To facilitate understanding of the present invention, the description of known technical matters will be omitted as appropriate in the following description.

Reference is made to FIG. 1. A vehicle display system 10 includes an image display unit 20, a display control device 30 that controls the image display unit 20, a current position determination device 410, and a map information storage device 420. It is assumed in the description of the present embodiment that the left-right direction when a driver 4 sitting on the driver's seat of an own vehicle 1 faces the front of the own vehicle 1 is the X-axis (the left direction is the X-axis positive direction), the up-down direction is the Y-axis (the up direction is the Y-axis positive direction), and the front-rear direction is the Z-axis (the front direction is the Z-axis positive direction).

The image display unit 20 of one embodiment in the vehicle display system 10 is a head-up display (HUD) device provided in a dashboard 5 of the own vehicle 1. The HUD device emits display light 20*a* toward a front windshield 2 (example of a projected member), and allows an image to be visually recognized in a display area 100 on the front side (in the Z-axis positive direction) of the front windshield 2 (example of a projected member). This allows the driver 4 to visually recognize the image superimposed on a foreground 300 which is the real space that can be visually recognized through the front windshield 2.

The display area 100 is an area of a flat surface, a curved surface, or a partially curved surface on which the image generated in the HUD device is formed as a virtual image, and is also referred to as an image forming surface. The display area 100 itself is not actually visually recognized by the driver 4, or has low visibility to the extent that it is difficult to be visually recognized.

The image display unit 20 includes a display 22 having a display surface that displays the image, and a relay optical system 24. The display 22 may be a transmissive display that transmits light from a back light such as a liquid crystal display (LCD), or may be a projection display that projects the image on a screen. In such cases, the display surface is the display surface of a transmissive display or a screen of a projection display.

The relay optical system 24 is disposed on the optical path of the light of the image from the display 22 between display 22 and the front windshield 2, and is composed of one or more optical members that project the light of the image from the display 22 onto the front windshield 2 outside the image display unit 20. The relay optical system 24 includes at least one concave mirror, but may additionally include, for example, one or more refractive optical members such as a lens, diffraction optical members such as hologram, and reflective optical members, or a combination thereof.

The image display unit 20 may be a head-mounted display (hereinafter, referred to as an HMD) device. The driver 4 wears the HMD device on the head and sits on the seat in the own vehicle 1, thereby visually recognizing the displayed image superimposed on the foreground 300 through the front windshield 2 of the own vehicle 1. The display area 100 in which the vehicle display system 10 displays a predetermined image is fixed (or adjustably arranged) at a specific position with reference to the coordinate system of the own vehicle 1, and by facing toward this direction, the driver 4 can visually recognize the image displayed in the display area 100 fixed at the specific position.

Based on the control of the display control device 30, the image display unit 20 can also display the image near a real object (an example of a specific positional relationship between the image and the real object), at a position overlapping a real object (an example of a specific positional relationship between the image and the real object), or at a position set based on a real object (an example of a specific positional relationship between the image and the real object), the real object being, for example, an obstacle (a pedestrian, a bicycle, a motorcycle, another vehicle, or the like), a road surface 6 of the travel lane, a road sign, a land object (for example, a building or a bridge), or the like that is present in the foreground 300 which is the real space (real scene) visually recognized through the front windshield 2 of the own vehicle 1. This also allows a viewer (typically the driver 4 seated in the driver's seat of the own vehicle 1) to perceive visual augmented reality (AR). The image display unit 20 can display the image including an AR image whose display position changes in accordance with the position of the real object and/or a non-AR image whose display position does not change in accordance with the position of the real object.

FIG. 2 is a block diagram of the vehicle display system 10 according to several embodiments. The display control device 30 includes one or more I/O interfaces 31, one or more processors 33, one or more image processing circuits 35, and one or more memories 37. The various functional blocks illustrated in FIG. 2 may be composed of hardware, software, or a combination both. FIG. 2 is merely one mode of the embodiments, and the constituent components illustrated may be combined into fewer components, or additional components may be provided. For example, an image processing circuit 35 (for example, a graphics processing unit) may be included in one or more processors 33.

As illustrated in the drawing, the processor 33 and the image processing circuit 35 are operatively coupled to a memory 37. More specifically, the processor 33 and the image processing circuit 35 execute a program stored in the memory 37 so as to operate the vehicle display system 10, such as generating and/or transmitting image data. The processor 33 and/or the image processing circuit 35 may include at least one general-purpose microprocessor (for example, a central processing unit (CPU)), at least one application-specific integrated circuit (ASIC), at least one field programmable gate array (FPGA), or any combination thereof. The memory 37 includes any type of magnetic medium such as hard disk, any type of optical medium such as a compact disc (CD) or a digital versatile disc (DVD), any type of semiconductor memory such as a volatile memory, and a non-volatile memory. The volatile memory may include a dynamic random access memory (DRAM) and a static random access memory (SRAM), and the non-volatile memory may include a read-only memory (ROM) and a nonvolatile read-only memory (NVROM).

As illustrated in the drawing, the processor 33 is operatively coupled to the I/O interface 31. The I/O interface 31 performs communication (also referred to as a controller area network (CAN) communication) with, for example, a vehicle electric control unit (ECU) 401, which will be described later, provided in the vehicle, and/or other electronic devices (indicated by reference numerals 401 to 420 described later) in accordance with the CAN standard. The communication standard adopted by the I/O interface 31 is not limited to CAN, and includes: a wired communication interface such as a CAN with Flexible Data Rate (CANFD), a Local Interconnect Network (LIN), Ethernet (registered trademark), a Media Oriented Systems Transport (MOST) (MOST is a registered trademark), a Universal Asynchronous Receiver Transmitter (UART), or a Universal Serial Bus (USB); or an in-vehicle communication (internal communication) interface which is a near field wireless communication network within a range of several tens of meters like a personal area network (PAN) such as Bluetooth (registered trademark) or a local area network (LAN) such as 802.11x Wi-Fi (registered trademark) network. The I/O interface 31 may also include a vehicle exterior communication (external communication) interface such as a wide-area communication network (for example, the Internet communication network) in accordance with a cellular communication standard such as a wireless wide area network (WWAN0, IEEE802.16-2004 (Worldwide Interoperability for Microwave Access (WiMAX)), IEEE802.16e Base (Mobile WiMAX), 4G, 4G-LTE, LTE Advanced, or 5G.

As illustrated in the drawing, the processor 33 is connected to the I/O interface 31 in a mutually operable manner, and thus can transmit and receive information to and from various other electronic devices and the like connected to the vehicle display system 10 (I/O interface 31). The I/O interface 31 is operatively connected to, for example, a navigation device, a vehicular ECU, the external communication device, and the like provided in the own vehicle 1. The display 22 is operatively connected to the processor 33 and the image processing circuit 35. Therefore, the image displayed by the image display unit 20 may be based on the image data received from the processor 33 and/or the image processing circuit 35. The processor 33 and the image processing circuit 35 control the image displayed by the image display unit 20 based on the information acquired from the I/O interface 31. The I/O interface 31 may include a function to process (convert, calculate, and analyze) information received from another electronic device, or the like, connected to the vehicle display system 10.

A graphic positioning system (GPS) device 411 illustrated in FIG. 2 detects the current position of the own vehicle and outputs the detected position data to the current position determination device 410.

The gyro sensor 412 detects angular velocities in the yaw, pitch, and roll directions, and outputs the detected angular velocity data to the current position determination device 410. The current position determination device 410 detects a change in the traveling direction of the vehicle by detecting the angular velocity in each of the yaw, pitch, and roll directions, and specifies the current position of the vehicle. Therefore, even in an area where a GPS signal cannot be received, such as in a tunnel, the current position of the own vehicle can be identified.

The current position determination device 410 determines the current position of the own vehicle based on the position data of the own vehicle detected by the GPS device 411, the angular velocity data of the own vehicle detected by the gyro sensor 412, and the map data of the vicinity of the own vehicle stored in the map database 401. Data indicating the current position is output to the display control device 30.

The map information storage device 420 is a storage medium that stores map data including the surroundings of the vehicle, and outputs the map data of the surroundings of the current position of the own vehicle to the display control device 30 based on the current position of the own vehicle determined by the current position determination device 410. Although FIG. 1 illustrates an example in which the map information storage device 420 is externally attached to the display control device 30, the map information storage device 420 may be incorporated in the display control device 30. The map information storage device 420 may be a server that distributes map information to the display control device 30 by communication from the outside of the own vehicle.

The software components stored in the memory 37 include a viewpoint setting module 501, a field of view setting module 503, and a map image generation module 511. The viewpoint setting module 501 sets the position of a virtual viewpoint MM with respect to an own vehicle position icon PP on the map, which will be described later, and a look-down angle (depression angle) θ from the virtual viewpoint MM. The viewpoint setting module 501 also changes the scale of the route guidance image 200. The field of view setting module 503 sets a virtual field of view E for determining a shape for cutting out a map around an own vehicle position icon PP. The map image generation module 511 reads map data around the vehicle from the map database 401, and generates, as a route guidance image, an image observed at a predetermined depression angle and a predetermined virtual field of view from a predetermined position of the virtual viewpoint MM.

FIG. 3 illustrates an area of the map image around the own vehicle displayed as the route guidance image. Here, it is assumed that the map is an cry plane, and there is a virtual viewpoint MM for displaying an overhead view at a position of a height Mβ on a β axis orthogonal to the ay plane, that is, in the sky behind the own vehicle position icon PP. In the example of FIG. 3, the viewpoint setting module 501 sets the virtual viewpoint MM at a position Mγ1 and Mβ1 behind (in the γ negative direction) and above (in the β positive direction) the vehicle position icon PP, and sets the depression angle θ to θ1. As illustrated in FIG. 3, the range of the map surrounded by a rectangular virtual field of view FGHJ at the look-down angle θ from the virtual viewpoint MM can be expressed by a trapezoid surrounded by reference signs F1'G1'H1'J1' having a wide range in the left-right direction (α direction) on the faraway side (γ positive direction) and a narrow range in the left-right direction (α direction) on the nearby side (γ negative direction). In at least some of the display modes of the present embodiment, the virtual field of view E has a narrower width in the left-right direction (α direction) in the region overlapping the faraway position of the map than the rectangular virtual field of view FGHJ. That is, the region of the map surrounded by the virtual field of view E (FKLJ) observed from the virtual viewpoint MM is surrounded by reference signs F1'K1'L1'J1' with the range in the left-right direction (α direction) thereof on the faraway side (γ positive direction) narrower than that in the range surrounded by reference signs F1'G1'H1'J1'.

FIG. 4 illustrates s a route guidance image of a comparative example. FIG. 5 illustrates a route guidance image in the present embodiment. A route guidance image 800 of the comparative example is a rectangle surrounded by the rectangular virtual field of view F1, G1, H1, and J1. In other words, the route guidance image 800 of the comparative example has a width (F1–J1) in the left-right direction (X-axis direction) of the region overlapping the nearby portion of the map is equal to a width (G1–H1) in the left-right direction (X-axis direction) of the region overlapping the faraway portion of the map.

On the other hand, the route guidance image 200 of the present embodiment, as illustrated in FIG. 5, has a nearby width Wn1 in the left-right direction (X-axis direction) of the region overlapping the nearby portion of the map longer than a faraway width Wf1 in the left-right direction (X-axis direction) of the region overlapping the faraway portion of the map. In other words, the ratio (Wf1/Wn1) of the faraway width Wf1 to the nearby width Wn1 is smaller than 1.

The viewpoint setting module 501 sets the position Mβ (Mγ) and the angle θ of the virtual viewpoint MM with respect to the map image. The viewpoint setting module 501 changes the position Mβ (Mγ) and the angle θ of the virtual viewpoint to change the map image area around the own vehicle displayed as the route guidance image. Typically, the viewpoint setting module 501 sets the position of the "virtual viewpoint" around the own vehicle (usually at an appropriate position behind the own vehicle). The angle θ of the "virtual viewpoint" is an angle between the αγ planea and the direction passing from the virtual viewpoint MM through a middle point in the vertical direction of a virtual field of view K, which will be described later, and is hereinafter also referred to as a depression angle.

The viewpoint setting module 501 sets the virtual viewpoint MM at a position Mγ and Mβ behind (in the γ negative direction) and above (in the β positive direction) the vehicle position icon PP. Thus, when the own vehicle travels straight on a straight travel lane and the own vehicle position icon PP is viewed from the virtual viewpoint MM, the overhead image of the own vehicle position icon PP traveling forward is obtained. As the virtual viewpoint MM moves, the map image around the own vehicle is displayed in a rotated manner (with the angle changed). For example, when the own vehicle position icon PP is steered to rotate the own vehicle position icon PP by 90 degrees in the counterclockwise direction as viewed from directly above, the virtual viewpoint MM is also rotated by 90 degrees in the counterclockwise direction in conjunction with the rotation of the own vehicle position icon PP.

When increasing the scale of the route guidance image, the viewpoint setting module 501 decreases the distance between the own vehicle position icon PP and the virtual viewpoint MM. Specifically, to decrease the distance between the own vehicle position icon PP and the virtual viewpoint MM, at least one of the distance Mγ in the front-rear direction (γ direction) and the distance Mβ in the up-down direction (β direction) is decreased. In FIG. 6, a distance Mγ2 in the front-rear direction (γ direction) and a distance Mβ2 in the up-down direction (β direction) of the virtual viewpoint MM are respectively shorter than the distance Mγ1 in the front-rear direction (γ direction) and the distance Mβ1 in the up-down direction (β direction) of the virtual viewpoint MM illustrated in FIG. 3.

In the example of FIG. 6, the viewpoint setting module 501 sets the virtual viewpoint MM at a position Mγ2 (<Mγ1) in the γ negative direction) and Mβ2 (<Mβ2) (in the β positive direction) behind and above the vehicle position icon PP, and sets the depression angle θ to θ2 (<θ1). The range of the map surrounded by a rectangular virtual field of view F2G2H2J2 at the depression angle θ2 from the virtual viewpoint MM can be expressed by a trapezoid surrounded by reference signs F2'G2'H2'J2' having a wide range in the left-right direction (α direction) on the faraway side (γ positive direction) and a narrow range in the left-right direction (α direction) on the nearby side (γ negative direction). The field of view setting module 504 sets a virtual field of view E2 different from the virtual field of view E1 illustrated in FIGS. 3 and 5. The region of the map surrounded by the virtual field of view E2 (F2K2L2J2) defining the area displayed as the route guidance image 212 is surrounded by reference signs F2'K2'L2'J2' with the range in the left-right direction (α direction) thereof on the faraway side (γ positive direction) narrower than that in the range surrounded by reference signs F2'G2'H2'J2'.

FIG. 7 illustrates a route guidance image observed from the virtual viewpoint illustrated in FIG. 6. In the route guidance image 212, a nearby width Wn2 in the left-right direction (X-axis direction) of the area overlapping the nearby portion of the map is longer than a faraway width Wf2 in the left-right direction (X-axis direction) of the area overlapping the faraway portion of the map. In other words, the ratio (Wf2/Wn2) of the faraway width Wf2 to the nearby width Wn2 is smaller than 1. In the route guidance image 212 illustrated in FIG. 7, the ratio (Wf2/Wn2) of the faraway width Wf2 to the nearby width Wn2 is larger than the ratio (Wf1/Wn1) of the faraway width Wf1 to the nearby width Wn1 in the route guidance image 211 illustrated in FIG. 5. The route guidance image 212 in FIG. 7 is formed to have a left region 212P (200P) surrounded by reference signs F2G2K2 between a bounding box 212B (200B) surrounding the route guidance image 212 and the left side of the route guidance image 212, and a right region 212Q (200Q) surrounded by reference signs H2J2L2 between the bounding box 212B (200B) and the right side of the route guidance image 212. The route guidance image 211 in FIG. 5 is formed to have the left region 211P (200P) surrounded by reference signs F1G1K1 between a bounding box 211B (200B) surrounding the route guidance image 211 and the left side of the route guidance image 211, and a right region 211Q (200Q) surrounded by reference signs H1J1L1 between the bounding box 211B (200B) and the right side of the route guidance image 211. The left region 212P and the right region 212Q in FIG. 7 are respectively smaller than the left region 211P and the right region 211Q illustrated in FIG. 5. When increasing the scale of the route guidance image 200, the field of view setting module 504 changes the virtual field of view E having a large ratio (Wn/Wf) of the faraway width Wf to the nearby width Wn (for example, changes from E1 to E2) so that the left region 200P and the right region 200Q become small.

First Embodiment

Therefore, the display control device 30 according to a first embodiment of the present invention is the display control device 30 that controls the head-up display device 20 that displays a video in front of the front windshield of a vehicle as a virtual image. The display control device 30 includes at least one processor 33 configured to display a route guidance image 200 on the head-up display device 20, in which a width (Wn) of a nearby region of the route guidance image 200 in the left-right direction (herein after referred to as a nearby width) is longer than a width (Wf) of a faraway region of the route guidance image 200 in the left-right direction (hereinafter referred to as a faraway width), and a ratio (Wf/Wn) of the faraway width (Wf) to the nearby width (Wn) is increased when the scale of the route guidance image 200 is increased.

The processor 33 increases the scale of the route guidance image 200. For example, the processor 33 executes the viewpoint setting module 501 to bring the virtual viewpoint MM closer to the own vehicle position icon PP, thus increasing the scale of the route guidance image 200. However, the method of changing the scale of the route guidance image 200 is not limited to this, and the processor 33 may read map data with a different scale stored in the map database 401.

The processor 33 increases the ratio (Wf/Wn) of the faraway width Wf to the nearby width Wn of the route guidance image 200 in accordance with an increase of the scale of the route guidance image 200. For example, the processor 33 executes the field of view setting module 503 to adjust the nearby width Wn and/or the faraway width Wf so as to increase the ratio (Wf/Wn) of the faraway width Wf to the nearby width Wn. When the scale of the route guidance image 200 is increased, the field of view setting module 503 can specifically execute at least one of the following: (1) maintaining the nearby width Wn and increasing the faraway width Wf, (2) decreasing the nearby width Wn and maintaining the faraway width Wf, (3) increasing the nearby width Wn and the faraway width Wf, while increasing a rate of increase of the faraway width Wf larger than that of the nearby width Wn; and (4) decreasing the nearby width Wn and the faraway width Wf, while decreasing a rate of decrease of the faraway width Wf smaller than that of the nearby width Wn.

When increasing the scale of the route guidance image 211 (200) illustrated in FIG. 5, the processor 33 changes the virtual field of view E from E1 illustrated in FIG. 5 to E2 illustrated in FIG. 7, thus increasing the ratio (Wf/Wn) of the faraway width Wf to the nearby width Wn from Wf1/Wn1 to Wf2/Wn2. Here, the changed faraway width Wf2 is shorter than the nearby width Wn.

The first embodiment emphasizes the sense of perspective by providing a short faraway width and a long nearby width of the route guidance image before enlarging the route guidance image, while also assuming an advantage of relatively widening the faraway display area which gradually becomes more useful in a situation of enlarging the route guidance image. In other words, highly useful information for users can be presented.

Second Embodiment

In a third embodiment, the processor 33 is configured to generate the route guidance image 200 so as to have a virtual depression angle θ from the virtual viewpoint MM, and decrease the depression angle θ when increasing the scale of the route guidance image 200.

The processor 33 decreases the depression angle θ when increasing the scale of the route guidance image 200. For example, the processor 33 executes the viewpoint setting module 501 to decrease the depression angle θ of the virtual viewpoint MM. However, the method of changing the scale of the route guidance image 200 is not limited thereto, and the processor 33 may read map data having a different depression angle stored in the map database 401.

When increasing the scale of the route guidance image 211 (200) illustrated in FIG. 5, the processor 33 changes the depression angle θ from θ1 illustrated in FIG. 3 to θ2 illustrated in FIG. 6. By decreasing the depression angle of the route guidance image, which is an overhead view display, the depression angle of the virtual viewpoint looking down the map image in the displayed route guidance image approaches the depression angle of the viewpoint of the user who is boarding the own vehicle and looking down the foreground view of the own vehicle. In other words, this reduces a gap between the route guidance image and the foreground visually recognized by the user, making it easier to connect the position information indicated by the route guidance image and the foreground. The second embodiment of the present invention facilitates the connection of the position information indicated by the route guidance image and the foreground, while also assuming an advantage of relatively widening the faraway display area which gradually becomes more useful.

Third Embodiment

In a third embodiment, the processor 33 displays the first route guidance image 211 having the first ratio (Wf1/Wn1) as illustrated in FIG. 5. When increasing the scale of the first route guidance image 211, the processor 33 displays a second route guidance image 212 having a second ratio (Wf2/Wn2) larger than the first ratio (Wf1/Wn1) as illustrated in FIG. 7. When increasing the scale of the second route guidance image 212, the processor 33 displays a third route guidance image 223 illustrated in FIG. 8 having a third ratio (Wf3/Wn3) larger than the second ratio (Wf2/Wn2), making a third nearby width Wn3 of the third route guidance image 223 (220) approximately equal to a third faraway width W3. The faraway width of the route guidance image which becomes more useful along with the enlargement of the route guidance image can be relatively increased.

Fourth Embodiment

In a fourth embodiment, the processor 33 displays the first route guidance image 211 having the first ratio (Wf1/Wn1)

as illustrated in FIG. 5. When increasing the scale of the first route guidance image 211, the processor 33 displays the second route guidance image 212 having the second ratio (Wf2/Wn2) larger than the first ratio (Wf1/Wn1) as illustrated in FIG. 7. When increasing the scale of the second route guidance image 212, the processor 33 displays a fourth route guidance image 234 having a fourth ratio (Wf4/Wn4) larger than the second ratio (Wf2/Wn4), making the fourth faraway width Wf4 of the fourth route guidance image 234 (230) longer than the fourth nearby width Wn4. The faraway width of the route guidance image which becomes more useful along with the enlargement of the route guidance image can be relatively increased.

In some embodiments, the route guidance image 200 is configured to include at least one of the left region 200P between the bounding box 200B surrounding the route guidance image 200 and the left side of the route guidance image 200, and the right region 200Q between the bounding box 200B and the right side of the route guidance image 200. In the left region and the right region, the route guidance image is not displayed. This allows the user to visually recognize the nearby width of the route guidance image as longer and the faraway width as shorter, thus emphasizing the sense of perspective. However, this is not limiting and, in a broad sense, the left region and the right region may display an image continuing from the route guidance image.

Fifth Embodiment

In a fifth embodiment, the processor 33 is configured to display, in at least one of the left region 200P and the right region 200Q, a route guidance peripheral image continuing from the route guidance image 200 and blurred and/or darkened.

FIG. 10 illustrates darkened left and right regions. The visibility of the image displayed in a left region 216P (200P) and a right region 216Q (200Q) continuing from the route guidance image 216 (210) is reduced by darkening. Therefore, the route guidance image 216 (210) has higher visibility than the image displayed in the left region 216P (200P) and right region 216Q (200Q), and lacks the left region 216P (200P) and right region 216Q (200Q) of the rectangular bounding box 216B (200B), giving the sense of perspective as an image having a short faraway width Wf6 (Wf) and a long nearby width Wn6 (Wn). Furthermore, darkening the left region 200P (the right region 200Q) can emphasize the sense of perspective of the route guidance image.

Sixth Embodiment

In a sixth embodiment, the processor 33 is configured to expand the display area of the route guidance image 200 so that the left region 200P becomes smaller when a map object 310 on the route guidance image 200 is present around the left region 200P, and expand the display area of the route guidance image 200 so that the right region 200Q becomes smaller when a map object 310 is present around the right region 200Q. In the example of FIG. 11, when a map object 315 (310) on a route guidance image 215 (200) is present around a left region 215P (200P), the processor 33 expands the display area of the route guidance image 215 so that the left region 215P becomes smaller. Accordingly, the display area of the route guidance image is expanded when the specific map object on the route guidance image is present in the left region (right region) in which no route guidance image is displayed, a blurred image continuing from the route guidance image is displayed, or a darkened image continuing from the route guidance image is displayed. This suppresses cutting off the specific map object from the route guidance image or displaying the specific map object on the boundary of the route guidance image.

Seventh Embodiment

In a seventh embodiment, the processor 33 is configured to reduce the display area of the route guidance image 200 so that the left region 200P becomes larger when a non-map object 320 different from the map object 310 on the route guidance image 200 is present around the left region 200P, and reduce the display area of the route guidance image 200 so that the right region 200Q becomes larger when the non-map object 320 is present around the right region 200Q. In an example of FIG. 11, the processor 33 is configured to reduce the display area of the route guidance image 200 so that the right region 200Q becomes larger when a non-map object 325 different from the map object 310 on the route guidance image 215 is present around the right region 215Q. The non-map object 320 is an image not corresponding to the position of the map image, such as a bar graph indicating the distance to a branch road. In the above embodiment, when increasing the scale of the route guidance image, the left region (right region) is relatively reduced and the faraway region of the route guidance image is relatively increased. However, when a non-map object is displayed in the narrowed left region and/or right region (the faraway region of the expanded route guidance image), the faraway region of the expanded route guidance image is difficult to recognize visually and is not effectively used. In the present embodiment, when visually recognizing such an enlarged faraway region of the route guidance image is difficult, the route guidance image can be reduced so as to increase the left region (right region), thus emphasizing the sense of depth.

The operations of the above-described processing processes may be implemented by executing one or more functional modules of an information processing apparatus, such as a general-purpose processor or an application-specific chip. Such modules, combinations of such modules, and/or combinations with known hardware that can be replaced with their functions are all included in the scope of protection of the present invention.

The functional blocks of the vehicle display system 10 are executed optionally and selectively by hardware, software, or a combination of hardware and software to carry out the principles of the various described embodiments. It will be understood by those skilled in the art that the functional blocks described in FIG. 2 may be optionally and selectively combined as appropriate or one functional block may be separated into two or more sub-blocks to carry out the principles of the described embodiments. Therefore, the description herein optionally and selectively supports as appropriate any possible combinations or divisions of the functional blocks described herein.

DESCRIPTION OF REFERENCE NUMERALS

1: Own vehicle
2: Front windshield
4: Driver
5: Dashboard
6: Road surface
10: Vehicle display system
20: Head-up display device (Image display unit)
20a: Display light
22: Display
24: Relay optical system
30: Display control device
31: I/O interface
33: Processor
35: Image processing circuit
37: Memory
100: Display area
200: Route guidance image
200B: Bounding box
200P: Left region
200Q: Right region
310: Map object
315: Map object
320: Non-map object
325: Non-map object
401: Map database
410: Current position determination device
411: GPS device
412: Gyro sensor
420: Map information storage device
501: Eye position setting module
503: Field of view setting module
504: Field of view setting module
511: Map image generation module
E: Virtual field of view
MM: Virtual viewpoint
Mβ: Height
Mγ: Distance
PP: Own vehicle position icon
Wf: Faraway width
Wn: Nearby width
θ: Angle (Depression angle)

The invention claimed is:

1. A display control device that controls an image display device, comprising:
    at least one processor displaying a route guidance image on the image display device, wherein
    a width of a nearby region of the route guidance image in a left-right direction (herein after referred to as a nearby width) (Wn) is longer than a width of a faraway region of the route guidance image in the left-right direction (hereinafter referred to as a faraway width) (Wf),
    a ratio of the faraway width (Wf) to the nearby width (Wn) is increased when a scale of the route guidance image is increased,
    the processor displays a first route guidance image having a first ratio (Wf1/Wn1), and
    the processor displays a second route guidance image having a second ratio (Wf2/Wn2) larger than the first ratio (Wf1/Wn1) when a scale of the first route guidance image is increased.

2. The display control device according to claim 1, wherein
    the processor generates the route guidance image in a manner to have a virtual depression angle (θ) from a virtual viewpoint, and
    the depression angle (θ) is decreased when the scale of the route guidance image is increased.

3. The display control device according to claim 1, wherein
    the processor displays a third route guidance image having a third ratio (Wf3/Wn3) larger than the second ratio (Wf2/Wn2) when a scale of the second route guidance image is increased, and a third faraway width (Wf3) of the third route guidance image is approximately equal to a third nearby width (Wn3) of the third route guidance image.

4. The display control device according to claim 1, wherein the processor displays a first route guidance image having a first ratio (Wf1/Wn1), the processor displays a second route guidance image having a second ratio (Wf2/Wn2) larger than the first ratio (Wf1/Wn1) when a scale of the first route guidance image is increased, the processor displays a fourth route guidance image having a fourth ratio (Wf4/Wn4) larger than the second ratio (Wf2/Wn2) when a scale of the second route guidance image is increased, and a fourth faraway width (Wf4) is longer than a fourth nearby width (Wn4) of the fourth route guidance image.

5. The display control device according to claim 1, wherein the route guidance image is formed to have at least one of a left region between a bounding box surrounding the route guidance image and a left side of the route guidance image and a right region between the bounding box and a right side of the route guidance image, and the processor displays, in at least one of the left region and the right region, a blurred and/or darkened route guidance peripheral image continuing from the route guidance image.

6. The display control device according to claim 1, wherein the route guidance image is formed to have at least one of a left region between a bounding box surrounding the route guidance image and a left side of the route guidance image and a right region between the bounding box and a right side of the route guidance image, when a map object on the route guidance image is present around the left region, the processor expands a display area of the route guidance image in a manner to reduce the left region, and when the map object is present around the right region, the processor expands the display area of the route guidance image in a manner to reduce the right region.

7. The display control device according to claim 1, wherein the route guidance image is formed to have at least one of a left region between a bounding box surrounding the route guidance image and a left side of the route guidance image and a right region between the bounding box and a right side of the route guidance image, when a non-map object which is different from the map object on the route guidance image is present around the left region, the processor reduces a display area of the route guidance image in a manner to expand at least the left region between the left region and the right region, and when the non-map object on the route guidance image is present around the right region, the processor reduces the display area of the route guidance image in a manner to expand at least the right region between the left region and the right region.

8. A head-up display device that projects, on a projected portion, an image to be drawn on a display, and displays a virtual image superimposed on a foreground of a vehicle, the head-up display device comprising:

at least one processor that controls the display to display a virtual image of a route guidance image, wherein a width of a nearby region of the route guidance image in a left-right direction (herein after referred to as a nearby width) (Wn) is longer than a width of a faraway region of the route guidance image in the left-right direction (hereinafter referred to as a faraway width) (Wf), and a ratio of the faraway width (Wf) to the nearby width (Wn) is increased when a scale of the route guidance image is increased, the processor displays a first route guidance image having a first ratio (Wf1/Wn1), and the processor displays a second route guidance image having a second ratio (Wf2/Wn2) larger than the first ratio (Wf1/Wn1) when a scale of the first route guidance image is increased.

9. A display control method that controls an image display device, the display control method comprising:

displaying a route guidance image on the image display device;

making a width of a nearby region of the route guidance image in a left-right direction (herein after referred to as a nearby width) (Wn) longer than a width of a faraway region in the left-right direction of the route guidance image (hereinafter referred to as a faraway width) (Wf); and increasing a ratio of the faraway width (Wf) to the nearby width (Wn) when a scale of the route guidance image is increased, a first route guidance image having a first ratio (Wf1/Wn1) is displayed, and a second route guidance image having a second ratio (Wf2/Wn2) larger than the first ratio (Wf1/Wn1) is displayed when a scale of the first route guidance image is increased.

* * * * *